United States Patent Office 3,455,210
Patented July 15, 1969

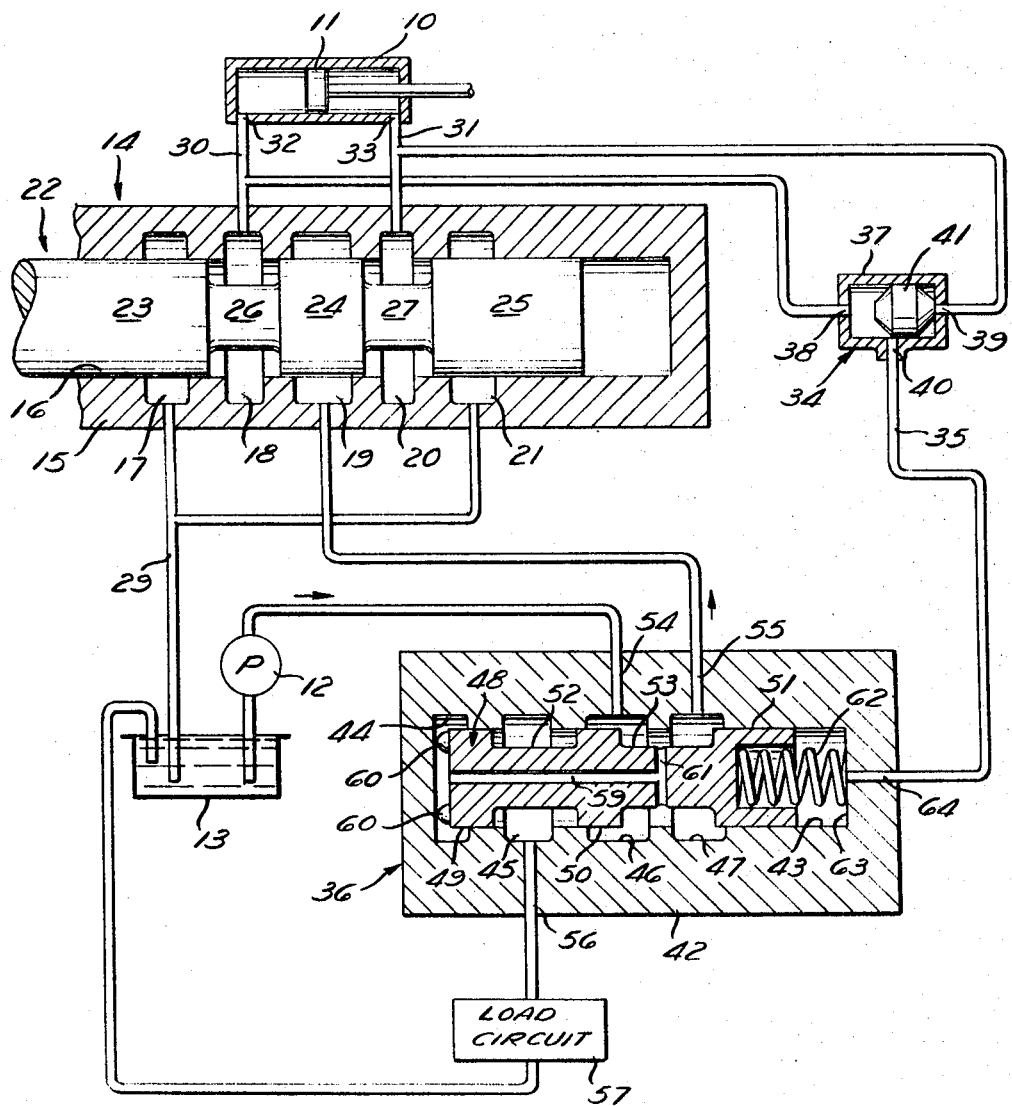

3,455,210
ADJUSTABLE, METERED, DIRECTIONAL FLOW
CONTROL ARRANGEMENT
John D. Allen, South Euclid, Ohio, assignor to Eaton
Yale & Towne, Inc., a corporation of Ohio
Filed Oct. 26, 1966, Ser. No. 589,558
Int. Cl. F15b *13/042, 9/08, 15/00*
U.S. Cl. 91—446                                    4 Claims

ABSTRACT OF THE DISCLOSURE

A flow control arrangement for selectively controlling the direction and speed of a hydraulic motor includes a reversible spool valve, which provides an adjustable flow restriction, and a pressure-compensating valve connected to sense the pressure drop across this flow restriction and to regulate the flow through it by bypassing excess flow away from the spool valve and by providing an additional flow restriction in series with the spool valve flow restriction.

---

This invention relates to an arrangement for adjustably controlling the speed and direction of operation of a fluid-operated device.

Various directional flow control arrangements, such as spool valves, have been provided heretofore for controlling the flow of hydraulic fluid to and from a fluid-operated actuator, such as a piston and cylinder or another type of fluid motor. Such prior arrangements have been satisfactory where the valve was fully actuated to each of its operating positions to open its passages fully, so as to provide full speed operation of the fluid-operated actuator. However, such arrangements have not been entirely satisfactory where it was desired to provide a reduced or metered, flow of fluid to or from the fluid-operated actuator to operate the actuator at reduced speed. For example, with conventional spool valves, if the valve spool is positioned to provide a partial flow condition, a very slight movement of the valve spool will produce a comparatively large change in the flow rate. To overcome this difficulty, it has been proposed to provide metering grooves or notches in the valve spool to enable more effective control over the flow rate for a given change in the position of the valve spool. However, such expedients have not been entirely satisfactory because the flow rate through such grooves or notches varies with the pressure of the fluid, so that a given setting of the valve spool does not necessarily produce a given flow rate.

In the copending U.S. patent application of Paul W. Herd, John D. Allen and Ray G. Holt, Ser. No. 429,064, filed Jan. 29, 1965, assigned to the same assignee as the present invention, there is disclosed a novel flow control arrangement which overcomes these difficulties by having the spool valve itself provide the flow restriction orifice for selectively establishing a reduced fluid flow to the fluid-operated actuator and by pressure-compensating the inlet flow passage through the spool valve to regulate the input flow therethrough to the fluid-operated actuator. While the flow control arrangement of the aforementioned application Ser. No. 429,064 is exceptionally well-suited for regulating the flow to a single fluid-operated actuator, its operation is adversely affected when there is an additional load circuit connected to receive excess flow from its pressure-compensating valve. Back pressure at this pressure-compensating valve, due to the additional load circuit, may prevent it from regulating the inlet flow through its spool valve in the manner intended.

The present invention is directed to a novel flow control arrangement which completely overcomes this difficulty, enabling the proper regulation of the restricted flow through the directional valve independent of back pressure which may be produced at the pressure-compensating valve by an additional load circuit.

Accordingly, it is an object of this invention, to provide a novel and improved flow control arrangement which enables the user to selectively establish a reduced fluid flow through a directional valve which does not vary substantially with changes in the pressure of the fluid supply or the load on the fluid-operated actuator.

It is also an object of this invention to provide such a flow control arrangement which enables the user to have a precise control over the restricted fluid flow rate, so as to provide the desired reduced speed of operation of the fluid-operated actuator.

Another object of this invention is to provide such a flow control arrangement in which the directional valve itself provides the flow restriction orifice which establishes a reduced fluid flow, with the restricted flow passage through the spool valve being pressure compensated in a novel manner to regulate the flow therethrough for controlling the speed of the fluid-operated actuator.

Another object of this invention is to provide such a flow control arrangement having provision for bypassing excess flow away from the directional valve to an additional load circuit without adversely affecting the regulation of the speed of the actuator.

Another object of this invention is to provide such a flow control arrangement which is adapted to be connected to one or more similar flow control arrangements, each for selectively controlling the operation of a respective actuator.

Further objects and advantages of the present invention will be apparent from the following detailed description of a presently-preferred embodiment thereof, which is schematically illustrated in the single figure of the accompanying drawing.

Referring to the drawing, the hydraulic system shown therein comprises a fluid-operated actuator in the form of a conventional cylinder 10 and piston 11. The piston is adapted to be moved in one direction or the other by hydraulic liquid delivered by a pump 12 from a sump 13 through a conventional spool valve 14. The inlet flow to the spool valve 14 is controlled by a pressure-compensating valve 36 as described hereinafter. The spool valve controls both the input flow from the pump to one end of the cylinder and the return flow from the opposite end of the cylinder back to the sump 13. The load (not shown) on the actuator is coupled to the shaft of piston 11 to be operated thereby, depending upon the latter's direction of movement.

The spool valve 14 comprises a housing or body 15 having a longitudinal cylindrical bore 16 therein and a plurality of annular recesses 17, 18, 19, 20 and 21, which intersect the bore at spaced locations along its length. Between these recesses the bore 16 presents cylindrical land surfaces. A valve spool 22 is slidably reciprocable in the bore 16, presenting three axially spaced cylindrical lands 23, 24 and 25, which are rigidly interconnected by reduced diameter stem portions 26 and 27. The lands 23–25 on the spool are sealingly engageable with the land surfaces of the bore 16. The spool may be selectively positioned axially along the bore manually or hydraulically or in any other convenient fashion.

The central recess 19 in the spool valve body 15 is connected to the output side of pump 12 through the pressure-compensating valve 36. The end recesses 17 and 21 in the spool valve body are both connected to a return line 29 leading back to the sump 13. The intermediate recesses 18 and 20 in the spool valve body are connected through respective lines 30 and 31 to the ports 32 and 33 at the opposite ends of cylinder 10.

In the neutral position of the valve spool 22, as shown in the figure, its central land 24 sealingly engages the bore 16 in the valve body on opposite sides of the central recess 19, its left end land 23 sealingly engages the bore between recesses 17 and 18, and its right end land 25 sealingly engages the bore between recesses 20 and 21. Accordingly, in this position of the valve spool, it blocks the pump 12 from both ends of cylinder 10, and both ends of the cylinder are blocked from the return line 29.

When the valve spool 22 is shifted to the left in the figure, its central land 24 is displaced away from sealing engagement with the bore 16 of the spool valve body between recesses 19 and 20, and at the same time its central land 24 continues to sealingly engage the bore between recesses 19 and 18, its left end land 23 is displaced away from sealing engagement with the bore between recesses 18 and 17, and its right end land 25 continues to sealingly engage the bore between recesses 20 and 21. Accordingly, hydraulic liquid can flow from pump 12 through the central recess 19 in the spool valve, around the spool stem portion 27 to recess 20, and from there through line 31 to the right end port 33 of cylinder 10, moving piston 11 to the left. Return flow from the left end port 32 of the cylinder passes through line 30 to recess 18 in the spool valve, around the spool stem portion 26 to recess 17, and from there through return line 29 back to the sump 13.

When the valve spool 22 is shifted to the right in the figure, its central land 24 is displaced away from sealing engagement with the bore 16 in the spool valve body between recesses 19 and 18, and at the same time its central land 24 continues to sealingly engage the bore between recesses 19 and 20, its right end land 25 is displaced away from sealing engagement with the bore between recesses 20 and 21, and its left end land 23 continues to sealingly engage the bore between recesses 17 and 18. Accordingly, hydraulic liquid can flow from pump 12 through the central recess 19 in the spool valve body, around the spool stem portion 26 to recess 18, and from there through line 30 to the left end port 32 of cylinder 10 to move piston 11 to the right. Return flow from the right end port 33 of the cylinder passes through line 31 to recess 20 in the spool valve, around the spool stem portion 27 to recess 21, and from there through return line 29 back to the sump 13.

A shuttle valve 34 of conventional design is connected between lines 30 and 31 and a line 35 leading to a pressure-compensating valve 36 in the present system. This shuttle valve includes a housing or body 37 having opposite end ports 38 and 39, which are connected respectively to lines 30 and 31, and a central port 40 connected to line 35. A valve member 41 is slidably disposed in the shuttle valve housing and is adapted to close one or the other of the end ports 38 and 39, depending upon the fluid pressure differential between them, and to permit fluid communication between the end port which is open and the central port 40.

The pressure-compensating valve 36 comprises a housing or body 42 having a longitudinal cylindrical bore 43 and a plurality of annular recesses 44, 45, 46 and 47, which intersect the bore at spaced locations along its length. Between these recesses the bore 43 presents cylindrical land surfaces. A valve piston 48 is slidably reciprocable in the bore 43 presenting three axially spaced, cylindrical land portions 49, 50 and 51, which are rigidly interconnected by reduced diameter stem portions 52 and 53. The lands on the piston are sealingly engageable with respective land surfaces of the bore 43.

The annular recess 46 in valve 36 is connected to the output side of the pump 12 through an inlet port 54. The recess 47 in valve 36 is connected by an outlet port 55 to the inlet recess 19 of the spool valve 14. The recess 45 in valve 36 is connected through an outlet port 56 to a load circuit 57 having a return line 58 extending back to the sump 13.

The valve piston 48 has a longitudinal passage 59 which at its left end communicates with the valve body recess 44. Protruding surfaces 60 on this end of valve piston 48 limit its movement to the left, so that the piston passage 59 is in fluid communication with recess 44 at all times. The right end of the piston passage 59 is connected to a cross passage 61 which in all positions of the valve piston 48 communicates with the valve body recess 47.

The land 51 at the right end of valve piston 48 is recessed internally to receive a coil spring 62 which is engaged under compression between this end of the valve piston and the right end wall 63 of the bore 43 in the valve body 42. The valve body has a port 64 connecting the outlet line 35 from shuttle valve 34 to the space behind the right end of valve piston 48.

The operation of the pressure compensating valve 36, as described in detail hereinafter, is such that port 54 will be referred to as its inlet port, port 55 as its controlled flow outlet port, port 56 as its excess flow outlet port, and port 64 as its pressure sensing port.

In operation of valve 36, its spring 62 normally urges the valve piston 48 to the left, to the position shown in the drawing, in which its land 50 blocks the inlet port 54 from the excess flow outlet port 56, and in which the inlet port 54 is in substantially unobstructed communication with the controlled flow outlet port 55. However, as described hereinafter, when the valve piston 48 moves to the right, its land 50 will open the excess flow outlet port 56 to the inlet port 54 and it will also gradually restrict the fluid flow from the inlet port 54 to the controlled flow outlet port 55.

Considering the operation of the system apart from the pressure condition at the excess flow outlet port 56, the line 30 or 31 which is passing the input flow to one end of the cylinder 10 will be at a higher fluid pressure than the other line 31 or 30 which is passing the return flow from the opposite end of the cylinder. In response to this pressure differential, the valve member 41 in the shuttle valve 34 will move over to block the end port 38 or 39 which is connected to the lower pressure return flow line and to connect the higher pressure input flow line to line 35. Accordingly, the pressure-sensing port 64 in the pressure-compensating valve 36 will be at substantially the same fluid pressure as the spool valve recess 18 or 20 which is conducting the input flow into the cylinder 10. It is to be understood that the lines connecting the spool valve 14 to the shuttle valve 34 and the line 35 connecting the shuttle valve 34 to the pressure-compensating valve 36 are greatly exaggerated in length in the figure for convenience of illustration, and that in actual practice the valves are sufficiently close to each other that there is substantially no fluid pressure difference between pressure-sensing port 64 of the pressure-compensating valve 36 and whichever spool valve recess 18 or 20 is conducting the input flow from pump 12 to cylinder 10.

From the drawing it will be apparent that the piston 48 presents surfaces facing to the left which are exposed to the fluid pressure at the controlled flow outlet passage 55 and surfaces facing to the right which are exposed to the fluid pressure at the pressure sensing port 64, which oppositely-facing surfaces are substantially equal in area. The fluid pressure at the inlet port 54 tends to move piston 48 to the right so as to connect inlet port 54 to the excess flow outlet port 56, while the fluid pressure at pressure sensing port 64 urges piston 48 to the left to block the inlet port 54 from the excess flow outlet port 56.

When it is desired to provide a restricted flow of fluid to and from cylinder 10 to move the piston 11 at a low speed, the valve spool 22 is shifted to the left or right from the neutral position shown, so as to provide a restricted inlet flow passage between pump 12 and one end of the cylinder and a restricted return flow passage between the opposite end of the cylinder and the return line. That is, the spool 22 itself constitutes the flow restriction orifice in the inlet flow passage, and the pressure differential across this flow restriction orifice provided by the spool valve determines the inlet flow rate to the cylinder. The controlled flow outlet port 55 of the pressure-compensating valve 36 is connected to the inlet side of this flow restriction orifice provided by the spool valve. The pressure-sensing port 64 of the pressure-compensating valve 36 is connected through the shuttle valve 34 to the outlet side of this flow restriction orifice provided by the spool valve. Accordingly, the higher fluid pressure at the inlet side of this orifice tends to urge piston 48 to the right and the lower fluid pressure at the outlet side of this orifice tends to urge piston 48 to the left, adding to the force in the same direction which is exerted by spring 62. Consequently, the fluid pressure differential across the flow restriction orifice provided by the spool valve 14 is applied across piston 48, which regulates the inlet flow through the spool valve as follows:

If, for a given setting of the valve spool, this inlet flow tends to increase (such as, if the output pressure of pump 12 increases or the load on piston 11 is reduced), this increased flow rate would produce an increased fluid pressure drop across piston 48, moving the latter to the right to spill more of the pump output to the excess flow outlet port 56 and thereby subtracting from the inlet flow through the spool valve.

Conversely, if the inlet flow through the spool valve 14 tends to decrease (such as, if the output pressure of pump 12 decreases or the load on piston 11 increases), this decreased flow rate, for a given setting of the spool 22, would produce a decreased fluid pressure drop across piston 48 in the pressure-compensating valve 36. Consequently this piston would move to the left to further restrict the flow from its inlet port 54 to its excess flow outlet port 56, thereby permitting an increase in the flow from pump 12 to the inlet passage through spool valve 14.

From the foregoing it will be apparent that the fluid pressure drop across the inlet flow restriction orifice provided by the spool valve 14 will be substantially equal to the fluid pressure drop between ports 55 and 64 of the pressure-compensating valve 36. That is, the fluid pressure drop across this orifice in the spool valve 14 will be sensed at ports 55 and 64 of the pressure-compensating valve 36 and will be applied across the piston 48 therein. For a given setting of the spool 22 (and thus a given orifice size in the inlet flow passage through the spool valve), any tendency of this fluid pressure drop across this spool valve orifice to increase or decrease will be sensed at ports 55 and 64 of the pressure-compensating valve 36 and will cause the latter's piston 48 to move in a direction to divert more or less of the pump output to the excess flow outlet port 56, and thereby eliminate the assumed change in the pressure drop across the inlet flow restriction orifice provided by the spool valve.

Consequently, for a given setting of the valve spool 22 the restricted inlet flow through the spool valve will remain substantially constant despite changes in the output pressure of pump 12 or of the load on piston 11.

Also, the pressure-compensating valve 36 will adjust automatically to changes in the setting of the valve spool 22 as follows:

If the valve spool 22 is shifted from one orifice size position to a smaller orifice size position, this will increase the pressure differential across the inlet flow passage through the spool valve, and this increase of the pressure differential will be sensed at ports 55 and 64 of the pressure-compensating valve 36, causing piston 48 therein to move to the right to provide an increased bypass flow between its ports 54 and 56, so that a higher percentage of the total output flow from pump 12 is diverted through valve 36 and away from the spool valve 14.

The reverse action takes place if the spool is shifted from one position to another providing an increased orifice size.

In the discussion thus far, the fluid pressure at the excess flow outlet port 56 has been ignored, and it has been assumed that the fluid pressure differential between ports 55 and 64 was not high enough to cause piston 48 to move far enough to the right to significantly restrict the flow between ports 54 and 55. However, depending upon the nature of the load circuit 57, the conditions can occur in which the fluid pressure at port 56 will be higher than at the pressure sensing port 64. Under such circumstances, the output pressure of pump 12 will increase to meet the demands of load circuit 57. Such an increased pump pressure would tend to produce a higher flow rate through the spool valve 14 than is called for by the setting of its valve spool 22. This tendency is offset in the present invention by virtue of the fact that if the bypass flow to the excess flow outlet port 56 is ineffective to fully compensate for the increased pump pressure, the piston 48 will be forced farther to the right so as to restrict the inlet flow through the pressure-compensating valve 36 to spool valve 14 between the inlet port 54 and the controlled flow outlet port 55. Therefore, the pressure-compensating valve 36 will provide a positive flow restriction on the inlet flow into the spool valve 14, as well as bypassing excess flow to the load circuit 57, if the load on its excess flow outlet port 56 causes the pump pressure to increase, as described.

From the foregoing it will be apparent that the pressure-compensating valve 36 in the present system regulates the flow through the spool valve 14 in two distinct but interrelated ways:

(1) First, it bypasses pump flow from the spool valve 14 to the load circuit 57 in accordance with the pressure drop across the inlet flow restriction orifice provided by the spool valve; and (2) If the bypass flow does not reduce the inlet flow into the spool valve to the flow rate corresponding to the latter's setting, then the piston 48 in the pressure-compensating valve 36 will move farther to the right to provide a flow restriction in series between the pump and the inlet of the spool valve 14, when necessary, in accordance with the fluid pressure established at its excess flow outlet port 56 by the load circuit 57 connected to the latter.

In the first sense, therefore, the pressure-compensating valve is, in effect, a bypass valve connected in parallel with the spool valve 14. In the second sense, the pressure-compensating valve 36 provides a flow restriction connected in series with the spool valve.

With this arrangement, the regulation of the input flow through the spool valve 14 is not adversely affected by whatever pressure conditions prevail at the excess flow outlet port 56 of the pressure-compensating valve 36. This is particularly advantageous where the user wants to operate two or more fluid-operated actuators from a single pump by a corresponding number of pressure compensated spool valves. In such event, the second spool valve has its inlet connected, through a pressure-compensating valve, to the excess flow outlet port of the first pressure-compensating valve, and so on. In each such flow control arrangement of the complete system the spool valve itself provides the flow restriction orifices in the input and return flow passages to and from the fluid-operated actuator, and the pressure-compensating valve regulates the inlet flow so that the latter is determined only by the setting of the valve spool and is substantially unaffected by changes in the pump output pressure or the load on the fluid-operated actuator. Accordingly, the speed of operation of the fluid-operated actuator will always be the same for a given setting of the spool valve. Also, very smooth modulation of the fluid flow proportional to the adjustment of the spool valve, is obtained.

While a presently-preferred embodiment of the invention has been described in detail herein and illustrated in the accompanying drawing, it is to be understood that the invention is susceptible of other embodiments and that various modifications, omissions and refinements which depart from the disclosed embodiment may be adopted without departing from the spirit and scope of this invention. For example, the shuttle valve 34 may be replaced by a different type of pressure-responsive valve or by a directional valve coupled to the spool valve for operation in unison therewith.

I claim:
1. A directional flow control arrangement for selectively operating a fluid-operated actuator means at a controlled speed comprising:
   directional valve means having an inlet and having connections to said actuator means and operable selectively to provide a restricted inlet flow passage of adjustable size therethrough for passing input pressure fluid from said inlet to said actuator means;
   and a pressure-compensating valve connected ahead of the inlet of said directional valve means and having an inlet port for connection to a source of pressure fluid, a sole source of pressure fluid for said actuator means connected to said inlet port, a controlled flow outlet port connected directly to the inlet of said directional valve means, an excess flow outlet port, valve means disposed between said inlet port and both said outlet ports to control the fluid flow from said inlet port to each of said outlet ports, and means for operating said valve means in response to the fluid pressure drop across said inlet flow passage through said directional valve means to control the division of flow from said inlet port to said outlet ports.

2. A flow control arrangement according to claim 1, wherein said valve means cooperates with said inlet and outlet ports, in response to an increased fluid pressure drop across said inlet flow passage through said directional valve means:
   first, to progressively open said excess flow outlet port to said inlet port to bypass away from said controlled flow outlet port an increasing amount of said fluid flow;
   and, if said bypass flow is ineffective to reduce the flow through said inlet passage of the directional valve means in accordance with the latter's setting, to progressively close said controlled flow outlet passage and thereby reduce the flow from said inlet port thereto.

3. A directional flow control arrangement for selectively operating a hydraulically-operated actuator means at a controlled speed comprising:
   a reversible spool valve having an inlet and having connections to said actuator means and operable selectively to provide a variable orifice between said inlet and said actuator means;
   and a pressure-compensating valve having an inlet port for connection to a source of pressurized hydraulic fluid, a sole source of pressure fluid for said actuator means connected to said inlet port, a controlled flow outlet port connected directly to the inlet of said spool valve, an excess flow outlet port, a pressure-sensing port connected to the outlet side of said variable orifice provided by said spool valve, a movable valve member controlling the flow of hydraulic fluid from said inlet port to both said outlet ports, means biasing said valve member to a position connecting said inlet port to said controlled flow outlet port and blocking said inlet port from said excess flow outlet port, and said movable valve member having oppositely facing surfaces thereon exposed respectively to the hydraulic fluid pressure at said controlled flow outlet port and at said pressure-sensing port and being positioned in accordance with the hydraulic pressure differential between said last-mentioned ports to control the division of hydraulic fluid flow from said inlet port to said controlled flow and excess flow outlet ports independent of the hydraulic fluid pressure at said excess flow outlet port.

4. A directional flow control arrangement according to claim 3, wherein said pressure-compensating valve has a bore which is intersected by said inlet port, said controlled flow outlet port and said excess flow outlet port intersect said bore on opposite sides of said inlet port, said movable valve member is slidable in said bore and has a land thereon which is sealingly engageable with the bore alternatively between the inlet port and the excess flow outlet port or between the inlet port and the controlled flow outlet port, said biasing means urges said movable valve member to a position in which said land sealingly engages the bore between the inlet port and the excess flow outlet port, and said movable valve member is movable in response to an increasing hydraulic fluid pressure differential between said controlled flow outlet port and said pressure sensing port to a position opening said excess flow outlet port to fluid flow from said inlet port and restricting the hydraulic fluid flow from said inlet port to said controlled flow outlet port.

References Cited

UNITED STATES PATENTS

| | | | |
|---|---|---|---|
| 1,964,196 | 6/1934 | Cuttat | 91—446 |
| 2,157,707 | 5/1939 | Keel | 91—446 |
| 2,748,947 | 6/1956 | Jay | 137—117 |
| 2,888,943 | 6/1959 | Hipple | 137—117 |
| 3,087,307 | 4/1963 | Faisandier | 91—466 |
| 3,128,789 | 4/1964 | Wagner | 137—596.13 |
| 3,145,734 | 8/1964 | Lee | 91—446 |
| 3,230,841 | 1/1966 | York | 91—446 |
| 3,234,957 | 2/1966 | Allen | 91—446 |

FOREIGN PATENTS 759,548   10/1956   Great Britain.

CARROLL B. DORITY, Jr., Primary Examiner

U.S. Cl. X.R.

137—117, 596.13